(12) United States Patent
Uiterloo (10) Patent No.: US 12,090,884 B2
(45) Date of Patent: Sep. 17, 2024

(54) BATTERY EXCHANGE SYSTEM AND METHOD

(71) Applicant: R U Engineering & Detachering B.V., Hoogvliet (NL)

(72) Inventor: Robbert Maria Uiterloo, Hoogvliet (NL)

(73) Assignee: R U Engineering & Detachering B.V., Hoogvliet (NL)

( * ) Notice: Subject to any disclaimer, the term of this patent is extended or adjusted under 35 U.S.C. 154(b) by 857 days.

(21) Appl. No.: 17/049,581

(22) PCT Filed: Apr. 25, 2019

(86) PCT No.: PCT/NL2019/050241
§ 371 (c)(1),
(2) Date: Oct. 22, 2020

(87) PCT Pub. No.: WO2019/212333
PCT Pub. Date: Nov. 7, 2019

(65) Prior Publication Data
US 2021/0261017 A1      Aug. 26, 2021

(30) Foreign Application Priority Data

Apr. 30, 2018 (NL) ..................................... 2020843

(51) Int. Cl.
*B60L 53/80* (2019.01)
*B60K 1/04* (2019.01)
(Continued)

(52) U.S. Cl.
CPC ................ *B60L 53/80* (2019.02); *B60K 1/04* (2013.01); *B60L 50/64* (2019.02); *B60L 50/66* (2019.02);
(Continued)

(58) Field of Classification Search
CPC .... B60K 2001/0438; B60K 2001/0472; B60K 2001/0488; B60L 53/80; B60S 5/06
See application file for complete search history.

(56) References Cited

U.S. PATENT DOCUMENTS 5,585,205 A    12/1996  Kohchi
7,404,720 B1   7/2008   Frey et al.
(Continued)

FOREIGN PATENT DOCUMENTS

CN        201825014 U     5/2011
DE    102011004839 A1     8/2012
(Continued)

*Primary Examiner* — Brian L Swenson
(74) *Attorney, Agent, or Firm* — N.V. Nederlandsch Octrooibureau (57) ABSTRACT

Battery exchange system for an electric vehicle, comprising: a battery unit; a battery receiving unit adapted for being fixed at or near a bottom surface of an electric vehicle and comprising a housing with an opening at a bottom side of housing for at least partially receiving the battery unit in the housing through the opening, wherein the battery receiving unit has a central axis which extends through the opening; wherein the battery receiving unit is adapted for allowing movement of the battery unit along its central axis between an unmounted position below the battery receiving unit and a mounted position at least partially within the battery receiving unit, wherein the battery unit comprises first engagement elements and the battery receiving unit comprises second engagement elements, each of the first and second engagement elements being adapted for engaging each other while moving relative to each other along an associated sloping path in order to lift the battery unit from the unmounted position to the mounted position or lower the battery unit from the mounted position to the unmounted position, wherein said associated sloping path slopes with respect to a plane normal to the central axis.

18 Claims, 8 Drawing Sheets

(51) Int. Cl.
  *B60L 50/60* (2019.01)
  *B60L 50/64* (2019.01)
  *B60S 5/06* (2019.01)
  *H01M 50/244* (2021.01)
  *H01M 50/249* (2021.01)
  *H01M 50/264* (2021.01)

(52) U.S. Cl.
  CPC ............ *B60S 5/06* (2013.01); *H01M 50/244* (2021.01); *H01M 50/249* (2021.01); *H01M 50/264* (2021.01); *B60K 2001/0472* (2013.01); *H01M 2220/20* (2013.01)

(56) References Cited

U.S. PATENT DOCUMENTS

| | | | |
|---|---|---|---|
| 10,807,492 B1 * | 10/2020 | Holland | B60L 53/60 |
| 2009/0058355 A1 | 3/2009 | Meyer | |
| 2010/0122843 A1 | 5/2010 | Yokouchi et al. | |
| 2012/0111654 A1 * | 5/2012 | Origuchi | B60L 53/80 |
| | | | 180/68.5 |
| 2012/0181981 A1 * | 7/2012 | Wechlin | B60L 53/80 |
| | | | 320/108 |
| 2012/0305323 A1 | 12/2012 | Baboy et al. | |
| 2013/0140099 A1 | 6/2013 | Ojima et al. | |
| 2014/0165354 A1 * | 6/2014 | Ojima | B60K 1/04 |
| | | | 29/281.1 |
| 2014/0196966 A1 * | 7/2014 | Ohgitani | B60K 1/04 |
| | | | 180/68.5 |
| 2015/0151624 A1 * | 6/2015 | Yamada | B60K 1/04 |
| | | | 180/68.5 |
| 2015/0197144 A1 * | 7/2015 | Jarocki | B60L 50/64 |
| | | | 180/68.5 |
| 2016/0221543 A1 * | 8/2016 | Corfitsen | B60K 1/04 |
| 2018/0154789 A1 * | 6/2018 | Janku | B66F 9/06 |
| 2018/0201110 A1 * | 7/2018 | Yin | F16B 35/045 |

FOREIGN PATENT DOCUMENTS

| | | |
|---|---|---|
| DE | 102014226372 A1 | 6/2016 |
| FR | 2272867 A1 | 12/1975 |
| GB | 1377729 A | 12/1974 |
| WO | 2010/033881 A1 | 3/2010 |
| WO | 2011/083228 A1 | 7/2011 |
| WO | 2012/116916 A2 | 9/2012 |
| WO | 2016/198552 A1 | 12/2016 |

* cited by examiner

BATTERY EXCHANGE SYSTEM AND METHOD

FIELD OF THE INVENTION

The present invention relates to a battery exchange system for an electric vehicle, comprising: a battery unit comprising a top surface, a bottom surface, and a circumferential side surface extending therebetween; a battery receiving unit adapted for being fixed at or near the vehicle's underside and comprising a housing with an opening at a bottom side of the housing for at least partially receiving the battery unit in the housing through the opening, wherein the battery receiving unit has a central axis which extends through the opening; wherein the battery receiving unit is adapted for allowing movement of the battery unit along the central axis between an unmounted position below the battery receiving unit and a mounted position at least partially within the battery receiving unit. The invention further relates to an electric vehicle provided with a battery exchange system, and a method for exchanging a battery in an electric vehicle.

BACKGROUND ART

From WO 2012/116916 a battery changing device is known comprising a battery carrier that can be loaded with a battery unit suitable for driving a motor vehicle, and a receiving unit for receiving the battery carrier. The known battery carrier comprises at least one first locking element, the receiving unit comprises at least one second locking element, and the battery carrier and the receiving unit are implemented such that the battery carrier can be brought into a locked position with the receiving unit by means of a locking motion comprising a rotary motion about a central axis of the battery carrier, wherein the first locking element and the second locking element engage one another in a form-fit manner in the locked position.

A drawback of the known device is that removal of the battery carrier from the receiving unit requires a considerable effort to align the first locking element of the carrier with the receiving unit before the battery can be moved out of the receiving unit, which adds to the amount of time needed to exchange the battery.

It is an object of the present invention to provide a battery exchange system for an electric vehicle which at least partially overcomes this drawback.

SUMMARY OF THE INVENTION

To this end, according to a first aspect, the invention provides a battery exchange system for an electric vehicle, comprising: a battery unit comprising a top surface, a bottom surface, and a circumferential side surface extending therebetween; a battery receiving unit adapted for being fixed at or near the vehicle's underside and comprising a housing with an opening at a bottom side of the housing for at least partially receiving the battery unit in the housing through the opening, wherein the battery receiving unit has a central axis which extends through the opening; wherein the battery receiving unit is adapted for allowing movement of the battery unit along the central axis between an unmounted position below the battery receiving unit and a mounted position at least partially within the battery receiving unit, wherein the battery unit comprises first engagement elements and the battery receiving unit comprises second engagement elements, wherein each of the first and second engagement elements are adapted for engaging each other while moving relative to each other along an associated sloping path in order to lift the battery unit from the unmounted position to the mounted position or lower the battery unit from the mounted position to the unmounted position, wherein the associated sloping path slopes with respect to a plane normal to the central axis. The central axis will generally extend substantially vertically when the battery receiving unit is fixed at or near the vehicle's underside.

When the battery unit is in the mounted position, it can be moved to the unmounted position simply by moving the first engagement elements relative to the second engagement elements along their associated sloping paths in a smooth continuous motion. There is no need to first rotationally align the battery unit within the battery receiving unit before moving the battery unit vertically towards the unmounted position, thus reducing the amount of time for exchanging a battery.

A further advantage is that, when the battery unit is in the unmounted position, a central axis of the battery unit initially does not need to be aligned to be completely parallel to the central axis the battery receiving unit above it. The first and second engagement elements, which initially may be spaced apart from each other, can be moved relative to each other until they do engage one another. Once the first and second engagement elements do engage each other the battery unit can be moved in a single, continuous motion from the unmounted to the mounted position, by driving further movement of the first engagement elements relative to the second engagement elements, in this manner also bringing the central axis of battery unit into parallel alignment with the central axis of receiving unit. The amount of time needed to align the battery unit with the battery receiving unit before it is moved from the unmounted position to the mounted position is thus reduced.

In an embodiment the first and second engagement elements are adapted for engaging each other, while moving relative to each other along the sloping path during lifting or lowering of the battery unit, in such a manner that the first and second engagement elements together carry the weight, preferably substantially the entire weight, of the battery unit during said relative movement of the first and second engagement elements.

Thus, at least while the first and second engagement elements engage each other and move relative to each other along the sloping path, no external lifting device is needed to lift the battery or lower the battery unit and the battery unit may be supported substantially or completely on the second engagement element of the battery receiving unit, via the first engagement elements. This also facilitates horizontal alignment of the battery unit with respect to the battery receiving unit, as the bottom surface of the battery unit may be suspended freely from the battery receiving unit during at least a portion of the movement in which the battery unit is moved to the mounted position. In an embodiment, the second engagement elements are adapted for moving relative to the housing in a common plane that is substantially normal to the central axis.

In an embodiment, each of the sloping paths extend over a distance of at least 10 cm along the direction of the central axis, preferably over a distance of at least 15 or at least 20 cm. This allows the battery unit to be lifted over this distance when it is moved from the unmounted position to the mounted position.

In an embodiment each of the sloping paths associated with one of said first engagement elements and one of said second engagement elements is spaced apart from the other sloping paths which are associated with another of the first engagement elements and another of the second engagement elements, each of said sloping paths comprising a starting point and an end point, wherein the starting points of the sloping paths lie in a first common plane, and the end points of the sloping paths lie in a second common plane. The first and second plane are typically parallel to each other and preferably both extend normal to the central axis. The first common plane in which the starting points are arranged typically lies above the second common plane in which the end points are arranged. By having multiple starting points in the first common plane, the ease of matching up the first engagements elements of the battery unit with the second engagement elements is further increased, resulting in a further reduction of time required for battery unit alignment prior to lifting. Preferably, the slope of the path decreases monotonically from the start point to the end point.

In an embodiment, the first engagement elements are arranged on an inner side of the battery unit, spaced apart from the outer surface of the circumferential surfaces of the top surface, bottom surface and circumferential side surface. The outer surfaces thus substantially protect the first engagement elements from damage.

In an embodiment, the opening of the housing has an area no more that 10% larger than the area spanned by the top surface of the battery unit, preferably between 5% and 10% larger. This allows the battery to be moved into the opening with some play.

In an embodiment the housing of the battery receiving unit is adapted for fitting around the circumferential side surface of the battery unit in such a manner that the housing confines rotation of the battery unit around the central axis to an angle of 10 degrees or less, preferably 5 degrees or less. Thus, even if the battery opening can be moved into the opening with some play, rotation of the battery unit around the axis of rotation over an angle of more than 10 degrees in a plane normal to the central axis is prevented.

In an embodiment the slope of each path extending between the first common plane and the second common plane has a positive gradient of less than 25 degrees from the first plane along the entire length of the sloping path between the first plane and the second plane. By having a relatively shallow positive gradient, i.e. a gradient of less than 25 degrees, the weight of the battery unit is largely supported by the path. As a result, a lower force is required for lifting the battery unit into its mounted position inside the battery receiving unit. Additionally, a force required to prevent the battery unit from undesired lowering inside the battery receiving unit under its own weight is lowered. Paths having a slope with such a positive gradient in the range of 0 to 14 degrees, in particular from 1 to 8 degrees, have been found to result in particularly smooth lifting of the battery into the battery unit. Preferably, the gradient varies along the path, with the gradient decreasing monotonically towards the end point of the path.

In an embodiment the battery receiving unit comprises at least three second engagement elements. The second engagement elements can thus be circumferentially distributed around the central axis, so they can support a battery unit from at least three separate point during lifting and lowering movements.

The sloping paths along which the first and second engagement elements move relative to each other can be embodied in several different ways. For instance, all of the sloping paths may be linear sloping paths and/or may each extend completely within a single plane. More preferably, each of said paths comprises or is formed as a segment of a substantially helical path. In the latter case, the vertical axis typically forms a central axis of the helical path. Using a segmented helical path allows the first engagement elements to be stationary with respect to each other and similarly also allows the second engagement elements to be stationary with respect to each other. As a result only a single motion for moving all first engagement and/or a single motion for moving all second engagement elements is required to be controlled for lifting or lowering the battery unit in a guided and self-aligning manner. Each of the helical paths preferably has a variable pitch, though the paths instead may have a constant pitch.

In an embodiment the second engagement elements are circumferentially spaced apart from each other, preferably substantially equidistantly, when viewed in projection onto the plane normal to the central axis. The second engagement elements thus provide a stable support for the battery unit, in particular during lifting and lowering of the battery into and out of the battery receiving unit.

In an embodiment the battery receiving unit further comprises one or more actuators for moving the first and second engaging elements relative to each other along their associated paths in order to lift the battery unit from the unmounted position to the mounted position or lower the battery unit from the mounted position to the unmounted position. The one or more actuators may comprise an electromechanical actuator, a hydraulic actuator and/or a pneumatic actuator. Preferably, the one or more actuators are adapted for moving in a common plane substantially normal to the central axis of the battery receiving unit during lifting or lowering of the battery unit.

In an embodiment each of said paths has a length of less than one sixth of the circumferential length of the circumferential side surface of the battery unit. Through the use of such relatively short paths, the full lifting and/or lowering movement of a battery into and out of the battery receiving unit can be achieved by moving the first engagement elements with respect to the second engagement elements over a distance that is considerably smaller than the circumferential side surface. For example, when each of the paths is formed as a segment of a helical path, the lifting and lowering motion of the battery unit require a rotating motion of the first engagement elements with respect to the second engagement elements which is less than one sixth of the circumference, e.g. less than 60°. Likewise, if the circumferential side surface has a substantially square or equilateral triangular cross-section, then each of the paths will have a length less than half of each of the sides of the circumferential side surface.

In an embodiment the first and second engagement elements are adapted for engaging each other while moving relative to each other along said sloping path to lift or lower the battery unit between the unmounted and mounted position such that the battery unit is lifted or lowered along the central axis in a substantially translational motion during which the battery unit rotates, in a plane normal to the central axis, no more than 15 degrees around the central axis. In this manner, build-up of rotational momentum of the battery unit during lifting and lowering thereof is substantially avoided. Moreover, this embodiment allows battery units to be used which have sidewalls having a cross-sectional contour of any shape, in particular a non-circular shape. The circumferential side surface of the battery unit, when viewed in projection onto a plane normal to a central axis of the battery unit which extends through the top and bottom surface, may have a non-circular outer contour, preferably a polygonal or ellipse-shaped contour. When using this embodiment, an automatic lifting platform as might be used for lifting batteries towards an unmounted position directly below the opening, only needs to lift the battery to that position, and does not need to support the battery or rotate it relative to the battery receiving unit as the battery it is lifted from the unmounted position to the mounted position by moving the first and second engagement elements.

A further advantage to using a battery unit with a non-circular outer contour is that when the battery unit is partially inserted into the battery unit to be lifted into the battery receiving unit by the battery exchange system, the rotational orientation of battery unit around the central axis is substantially limited. This makes it easier to predict the positions where the second engagement elements will engage the first engagement elements, resulting is shorted movement of the second engagement elements relative to the housing, thus further reducing battery mounting time.

In an embodiment, the opening of the battery receiving unit is shaped to substantially accommodate the side surface with some play in a plane normal to the central axis of the battery receiving unit. The play in said plane between the battery unit and the battery receiving unit further allows the battery unit to be lifted up into the battery receiving unit, even if initially the central axis of the battery unit and the central axis of the battery receiving unit are at an angle to each other, and/or if the battery unit is not precisely rotationally aligned around its central axis with respect to the battery receiving unit. For instance, when the battery unit is in the unmounted position below the battery receiving unit and with at least one of the second engagement elements contacting one of the first engagement elements, said play may comprise translation in the plane, e.g. over a distance of between 1 and 2.5 cm.

In an embodiment the opening has a non-circular shape which substantially matches the shape of the circumferential side surface of the battery unit. Rotation of the battery unit within the opening, in particular around the central axis, is thus substantially restricted.

In an embodiment, substantially the entire circumferential sidewall extends normal to the bottom surface and/or to a central axis of the battery, between the bottom surface and the top surface, wherein the battery receiving unit is provided with abutment portions for abutting parts of the sidewall when the battery unit is in the mounted position.

In an alternative embodiment, substantially the entire circumferential sidewall tapers from the bottom surface towards the top surface of the battery, wherein the battery receiving unit is provided with abutment portions for abutting parts of the sidewall when the battery unit is in the mounted position. The sidewall may substantially have the shape of the sidewall of a frustum.

In an embodiment the first and second engagement elements form pairs of first and second engagement elements for engaging each other, wherein in each pair one of the first and second engagement elements comprises a portion adapted for engaging the other element of said pair during movement of the battery unit between the mounted and unmounted position and wherein said portion is ramped with respect to the first and second planes. Hereby, in each pair one of the first and second engagement elements essentially forms the sloping path along which the other engagement element of the pair is moved during the lifting and lowering of the battery unit.

In a further embodiment each pair of the pairs of engagement elements may comprise one or more rollers for rolling engagement with the other element of said pair during movement of the battery unit between the mounted and unmounted position. By including rollers the friction between the first and second engagement elements is reduced, resulting in a lower required force to lift the battery unit into the battery receiving unit. Additionally, through the reduced friction, wear of the engagement elements is reduced.

In an embodiment the battery receiving unit comprises a support ring that is rotatable relative to the housing around the central axis of the battery receiving unit, wherein the second engagement elements are mounted on the support ring. Preferably, rotation of the support ring around the central axis over less than 20 degrees is sufficient to move the battery unit from the unmounted position to the mounted position. The one or more actuators as described earlier herein may be adapted for making rolling contact with the support ring, an may for instance comprises stepper motors or a single stepper motor driven belt drive, a pinion or worm screw driven support ring, or even one or more linear actuators connected at one end to the support ring and at another to the housing, for driving reciprocating motion of the ring around its central axis to move a battery unit from the unmounted position to the mounted position and vice versa.

In an embodiment each of the second engagement elements comprises one or more rollers that are rotatable around axes that extend substantially normal to the central axis. When a support ring is used, the rollers may be rotatable with respect to the support ring around axes in a common plane that extends substantially normal to the central axis. In this manner, when the support ring is rotated around the central axis while the first and second engagement elements engage each other, the rotation of the ring will cause rolling contact between and second engagement elements.

In an embodiment the battery receiving unit comprises a mechanical locking mechanism for locking the battery unit in position when the battery unit is in the mounted position. Such a locking mechanism ensures the battery unit remains in its mounted position until the next battery exchange is desired, e.g. regardless of driving conditions and forces acting on the battery unit resulting therefrom. The locking mechanism may be adapted for blocking rotation of the support ring relative to the housing. Alternatively and/or additionally, the locking mechanism may comprise the one or more actuators for moving the engagement elements relative to each other, wherein the actuators are adapted to be releasably locked in position when the battery unit is in the mounted position.

In an embodiment the support ring is provided with a toothed section which forms part of the locking mechanism, the locking mechanism further comprising a pinion or a worm screw arranged for engaging the toothed section. For example, the one or more actuators may comprise a worm screw the actuators, worm screw and toothed section together forming a worm drive for driving rotational movement of the support ring. When the worm screw is not driven by the actuators, it still engages the toothed section, in this manner substantially blocking rotation of the support ring around the central axis. In this example the support ring may thus form a locking ring.

In an embodiment, the battery receiving unit is provided with sensors, arranged at or near the bottom side of the battery receiving unit, for sensing a position and/or orientation of the battery unit relative to the central axis when the battery unit is arranged below the opening. Such sensors enable the battery exchange system to be set up such that the actuator is started only and immediately when the battery unit is correctly placed below the battery receiving unit, resulting in a fast and efficient mounting routine. Further, such sensors may be set up to interact with any automatic lifting platform, enabling the lifting platform to place the battery below the receiving unit in the correct position. The sensors may be powered by a small additional internal battery inside the car on which the receiving unit is mounted, as generally used to power for example the interior light, clock and radio of the car. This arrangement allows the sensors to be operational independent of the battery unit which is being exchanged.

In an embodiment the battery unit further comprises a circumferential seal arranged at a top side of the battery unit, and/or the battery receiving unit comprises a circumferential seal arranged around the opening for contacting a top side and/or side surface of the battery unit when the battery unit is in the mounted position. A seal prevents ingress of moisture and debris into the battery exchange system, which may otherwise negatively affect the operability and durability of the system. The seal is arranged for making sealing contact with the top surface of the battery unit and a bottom surface of the battery receiving unit when the battery unit in the mounted position. The circumferential seal may be arranged, when viewed in projection onto a plane normal to the central axis, arranged around the first engaging elements. In this arrangement, also the engagement elements are fully protected from ingress of moisture and debris, which could otherwise result in damage and increased wear of the engagement elements.

In an embodiment, a distance between the top surface and the bottom surface of the battery unit is 20 cm or less. As a result, the battery exchange system can easily be integrated in the underside of any vehicle, without requiring further design alterations to retain loading space. The battery exchange system could therefore also be installed in already existing vehicles. To this end, the present invention also covers an electric vehicle comprising the battery exchange system according to the invention.

According to a second aspect, the present invention provides an electric vehicle comprising the battery exchange system as described herein. Preferably the battery receiving unit further comprises one or more actuators for driving movement of the second engaging elements relative to the corresponding first engagement elements along their associated paths, and relative to the housing.

According to a third aspect, the present invention provides a battery exchange method for an electric vehicle comprising a battery receiving unit fixed at the vehicle's underside and comprising a housing with an opening at a bottom side of the housing for at least partially receiving the battery unit in the housing through the opening, wherein the battery receiving unit has a central axis which extends through the opening and is further provided with second engagement elements arranged within the housing, the method comprising:
  i) placing a battery unit below the opening of the housing, such that, wherein viewed in projection onto a plane normal to the central axis, the battery unit is completely overlapped by the opening, the battery unit comprising first engaging elements for engagement with said second engagement elements,
  ii) using a lifting device external to the electric vehicle, lifting the battery unit towards the opening to an unmounted position; and
  iii) moving each of the first engagement elements into engagement with a corresponding one of said second engagement elements, and subsequently driving further movement the each of the first and second engagement elements relative to each other along an associated sloping path in order to lift the battery unit from the unmounted position to the mounted position, wherein each of said associated sloping paths slopes with respect to a plane normal to the central axis.

In an embodiment the step of placing the battery unit below the battery receiving opening further comprises orienting the battery unit around the vertical axis such that the first and second engaging elements are aligned in a vertical direction.

In an embodiment the battery receiving unit comprises a support ring that is rotatable relative to the housing around the central axis of the battery receiving unit, wherein the second engagement elements are mounted on the support ring, and step iii) comprises driving rotation of support around the central axis for bringing the first and second engagement elements into engagement with each other and driving said further movement of the first and second engagement elements along the associated sloping paths.

In an embodiment, the method is performed using a battery exchange system as described above.

According to a fourth aspect, the invention provides a battery exchange system for an electric vehicle, comprising: a battery unit; a battery receiving unit adapted for being fixed at or near a bottom surface of an electric vehicle and comprising a housing with an opening at a bottom side of housing for at least partially receiving the battery unit in the housing through the opening, wherein the battery receiving unit has a central axis which extends through the opening; wherein the battery receiving unit is adapted for allowing movement of the battery unit along its central axis between an unmounted position below the battery receiving unit and a mounted position at least partially within the battery receiving unit, wherein the battery unit comprises first engagement elements and the battery receiving unit comprises second engagement elements, each of the first and second engagement elements being adapted for engaging each other while moving relative to each other along an associated sloping path in order to lift the battery unit from the unmounted position to the mounted position or lower the battery unit from the mounted position to the unmounted position, wherein said associated sloping path slopes with respect to a plane normal to the central axis.

SHORT DESCRIPTION OF DRAWINGS

The present invention will be discussed in more detail below, with reference to the attached drawings, in which.

DESCRIPTION OF EMBODIMENTS

Figure 1A:
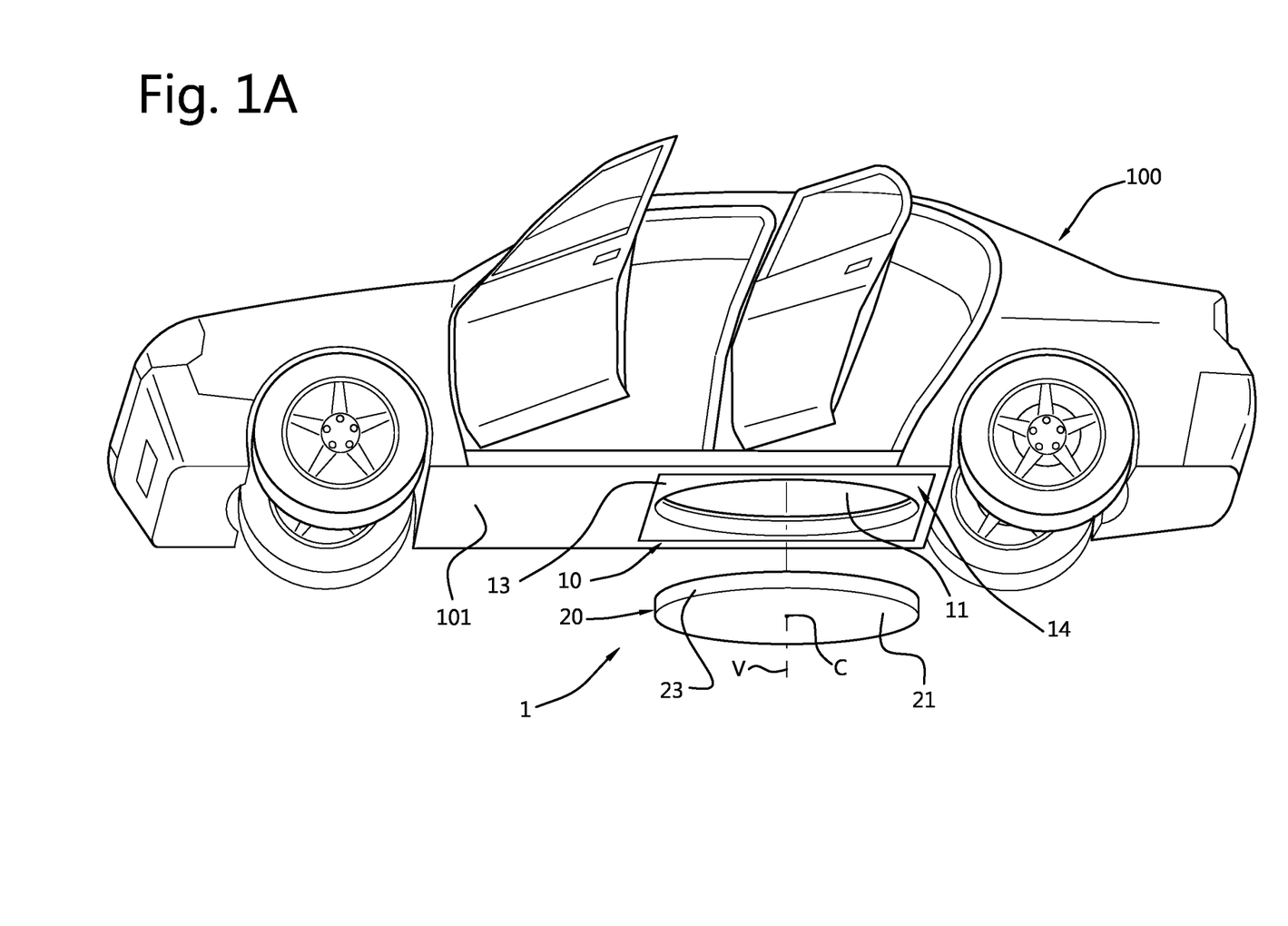
FIGS. 1A, 1B and 1C show respectively an electric vehicle with a battery exchange system according to the invention, an exploded view of said battery exchange system, and an isometric view of the housing of the battery receiving unit, FIGS. 2A and 2B provide detailed views of a pair of first and second engagement elements as used in a battery exchange system of the invention.

FIG. 1A shows an electric vehicle 100 with a battery exchange system 1 according to the invention. The battery exchange system comprises a battery unit 20 and a battery receiving unit 10 having a housing 14 with an opening 11 at its bottom side for receiving the battery unit 20. The vehicle has an underside 101 facing the ground and at which the battery receiving unit 10 is mounted. The battery receiving unit has a central axis C which extends through the receiving opening 11. In the orientation of the battery receiving unit 10 shown in FIG. 1A, the central axis C substantially coincides with a vertical axis V. The battery unit 20 is displaceable along said central axis C between an unmounted position below the battery receiving unit 10 and a mounted position inside the receiving opening 11 of the battery receiving unit 10. The battery unit 20 has a circumferential side surface 23 which has a shape which substantially corresponds to the circumferential shape of the receiving unit's circumferential side surface 17 which defines the opening 11, so that when the battery unit is received in the battery receiving unit it fits with some play in the housing. Though in FIG. 1A the battery unit 20 has a substantially cylindrical circumferential shape, it will be appreciated that other circumferential shapes, e.g. a frustoconical shape or shapes having a non-circular contour, are conceivable as well. In the embodiment shown, the battery receiving unit 10 is mounted to the vehicle in such a manner that a bottom plate 13 of the battery receiving unit 100 lies substantially flush with the underside 101 of the vehicle 100. Alternatively however the battery receiving unit may be mounted against vehicle's underside, with the receiving unit's housing 14 extending partially or completely below the vehicle's underside 101 and with the bottom plate 13 lying below said underside. The latter manner of mounting the battery exchange system to a vehicle allows easy retrofitting of the battery exchange system to a vehicle.

Figure 1B:
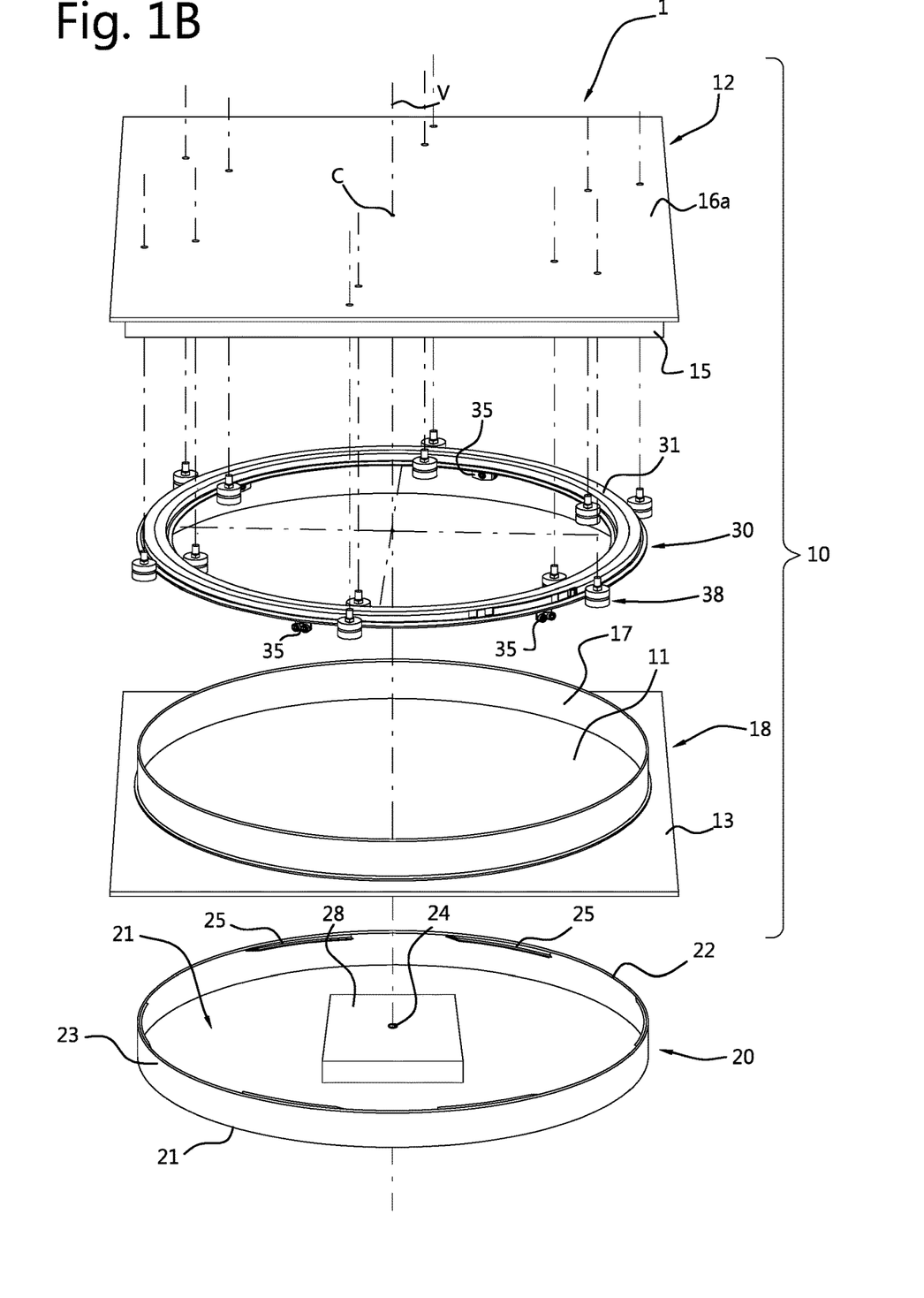
Figure 1C:
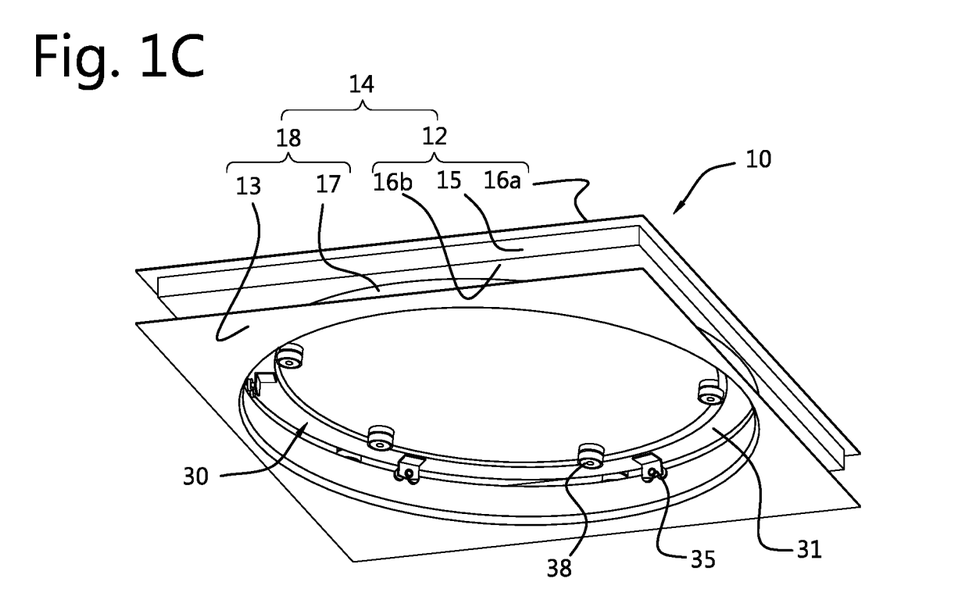

FIGS. 1B and 1C respectively show schematically an exploded view of the battery exchange system 1 of FIG. 1A, and an isometric view of the battery receiving unit 10 thereof. The battery receiving unit 10 has a top section 12 for mounting to a vehicle, a battery lifting system 30, and a bottom section 18. The battery lifting system 30 is provided with a support ring 31 on which second engagement elements 35 are mounted, each of which is adapted for engaging a first engagement element 25 of the battery unit 20 while moving relative thereto along an associated sloping path. The support ring is rotatable around the central axis C of the battery receiving unit for moving the second engagement elements 35 relative to the first engagement elements 25 along respective associated sloping paths while the first and second engagement elements contact each other. The support ring is rotatably supported around the central axis C by a number of bearings 38 which are mounted to a top plate 16a of the top section 12. The top section further comprises an outer circumferential side surface 15 which is attached at one side to the top plate 16a and at another side to the bottom plate 16b of the top section 12. The bottom section 18 comprises the inner circumferential side surface 17, and on its lower side comprises a plate 13 to which the side surface 17 is fixed and which is provided with the opening 11. When the battery receiving unit is in an assembled state, the outer side plate 15 is fixed to the lower plate 13 and/or to the side surface 17, e.g. by means or bolts.

The first engagement elements 25 are formed as separate ramped portions that attached, e.g. by welding, to the inner surface of the circumferential side surface 23 near edge 22 of the battery unit which forms an upper surface of the battery unit.

The battery unit 20 of the system 1 comprises a series of batteries in a container 28, here shown schematically, the container surrounding the batteries in a substantially water tight manner. An electrical connector 24 is provided at a top side of the container 28 and is arranged to coincide substantially with the central axis when the battery unit is in the mounted position. Electrical power can be supplied from the batteries within the container 28, via the electrical connector 24, to the electric vehicle. The full height of the battery exchange system 1, including the battery receiving unit, is no more than 20 cm when the battery unit 20 is held in the mounted position in the battery receiving unit 10. The battery unit typically has a diameter between 80 cm and 130 cm. As a result the system can easily be integrated in existing vehicle designs or built into existing vehicles without negatively impacting the loading space capacity or ride height too much. For trucks and other heavy vehicles these dimensions may be scaled up depending on their power requirements and/or size constraints.

Figure 3:
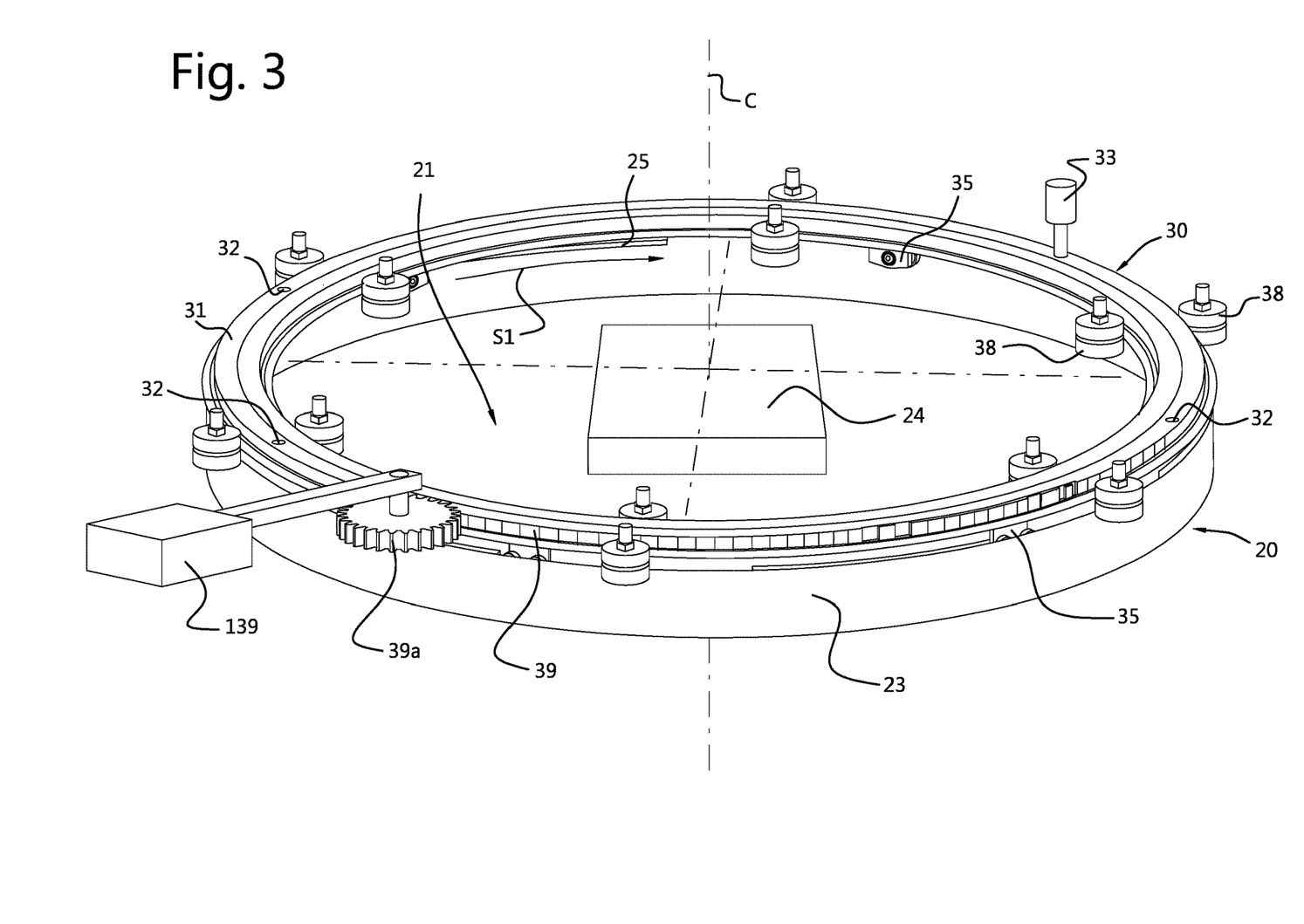
FIG. 3 shows a detail of a battery lifting system as may be part of a battery exchange system according to the invention, FIGS. 4A-4C schematically show alternative embodiments of a battery exchange system according to the present invention.

FIG. 1C shows an isometric view of the battery receiving unit 10. The rotary support ring 31 is placed between the bearings 38 such that the bearings hold the ring at a fixed distance along the direction of axis C from the top plate 12. The second engagement elements 35 are attached to the support ring 31 so that rotation of the ring 31 around the central axis C will cause the second engagement elements to move relative to the first engagement elements. For driving rotation of the support ring 31, one or more actuators may be provided as will be apparent to the skilled person. An example of an actuator for driving rotation of the ring is shown in FIG. 3

The circumferential sidewall 17 extends from the bottom plate 13 towards the bottom plate 16b of the top section 12, and the circumferential outer side plate 15 extends from the bottom plate 16b to the top plate 16a such that, when the bottom section 18 of the battery receiving unit is attached to the top section 12, the battery receiving unit 10 forms a battery unit receiving space that is substantially closed except at the battery receiving opening 11.

Figures 2A, 2B:
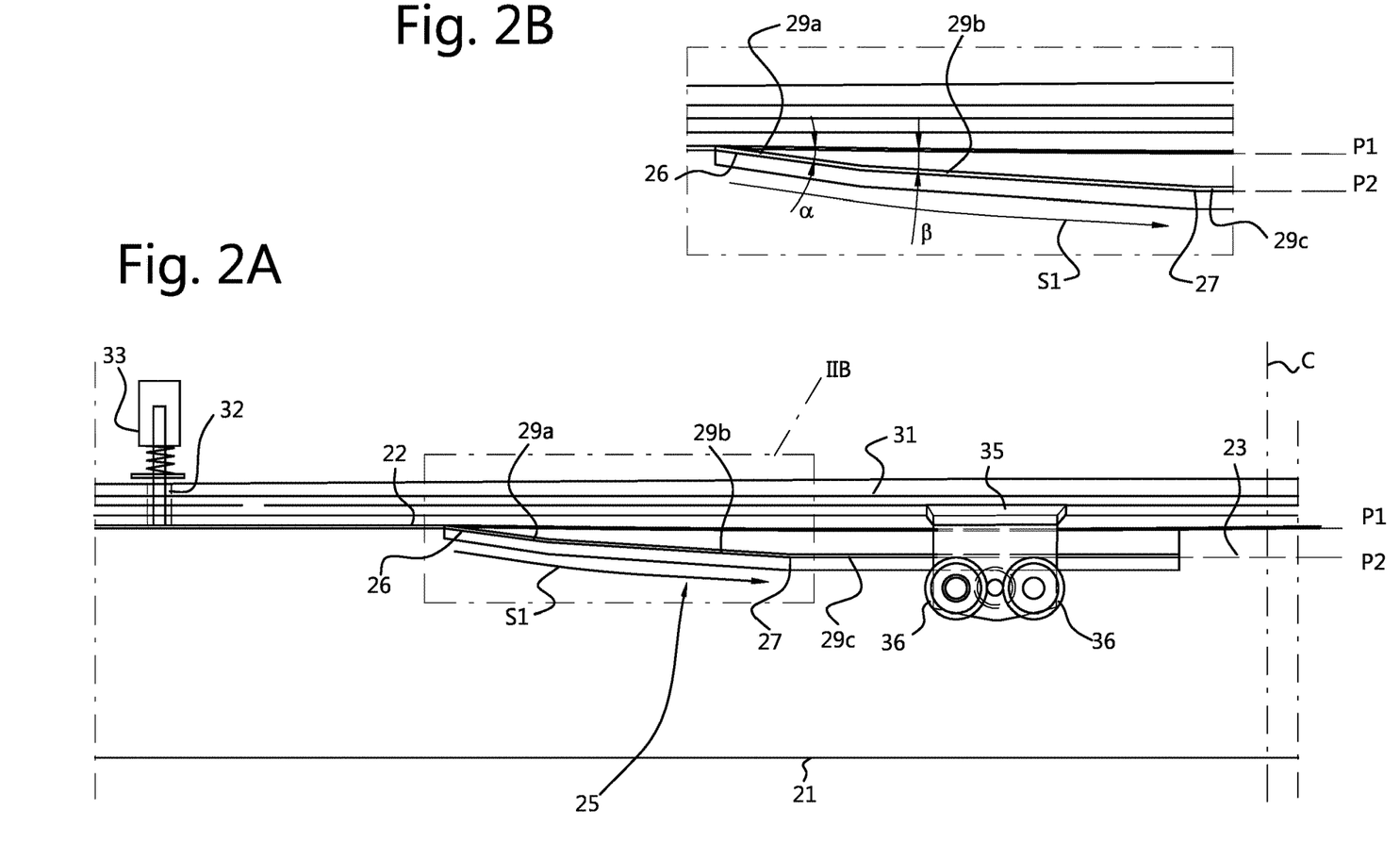

FIGS. 2A and 2B show a details of a portion of inner side views of the battery exchange system of FIG. 1B, in which a first engagement element 25 of the battery unit is in engagement with a rollers 36 of a second engagement element 35 of the battery receiving unit. In this example, the first engagement element 25 is formed as a ramped track that is fixed, e.g. welded, to the inner surface of the circumferential side surface 23. Alternatively the ramped track may be formed from the circumferential side surface 23, e.g. by cutting and bending a portion of a circumferential plate which forms the circumferential side surface. Portions 29a, 29b of the track extend along a substantially helical segment along the side surface 23 and define a path from a starting point 26 in a first plane P1 near the upper edge 22 of the side surface and includes sloping sections 29a, 29b towards a lower end point 27 in a second plane P2 that is parallel to the first plane and spaced apart therefrom along the direction of the central axis C. The path defined by track portions 29a, 29b slopes relative to a plane normal to the central axis C, as indicated by the arrow S1 along the path. The track further comprises a portion 29c that does not slope with respect to said plane, but extends substantially parallel to the plane normal to the central axis C. Though in FIGS. 2A and 2B only one path has been indicated by the arrow S1, it will be clear from FIG. 1B that the battery exchange system of FIG. 1B comprises an additional five of such paths which are defined by corresponding tracks portions.

The second engagement element 35 is shown engaging the first engagement element 25 on a downwardly directed surface of portion 29c of the track which portion extends substantially normal to the central axis C. The first and second engagement elements can move relative to each other along the path defined by the track, for moving the battery unit guided between an unmounted and a mounted position. Due to the shape of the tracks, the engagement elements 25, 35 can engage each other when the ring is rotated while the battery unit is arranged partially within the opening. Thus, even if battery's central axis which extends normal to its bottom surface is not completely aligned with the central axis C of the battery receiving unit 10, rotation of the ring may drive relative movement between the first and second engagement elements, where upon during further rotation of the ring the two central axis will become substantially aligned with each other.

Sloping portion 29a extends at an angle of about 11 degrees to plane P1 in the direction from the starting point towards the end point and transitions into sloping portion 29b which extends at an angle of about 5 degrees to said plane P1 in the direction towards the end point 27, as can be seen more clearly in FIG. 2B. Both angles $\alpha$, $\beta$ are less than 25 degrees to said plane P1, allowing for the load exerted by the battery unit 20 on the second engagement elements 35 to be mainly supported by the first engagements elements 25 and resulting in a minimal force requirement for moving the first engagement elements 25 with respect to the second engagement elements 35 in a direction normal to the vertical axis C during lifting and lowering of the battery unit. This minimal force requirement is further enhanced by limiting the friction between the first and second engagement elements 25, 35. Well known methods of reducing friction could be implemented and may involve the application of a low-friction plastic layer on either one or both engaging surfaces of the first and second engagement elements 25, 35. In the depicted embodiment the friction reduction has been achieved through the use of rollers 36.

The portion 29a which comprises the start 26 of the sloping path has a greater slope to the plane P1 and a shorter length than the subsequent portion 29b. Track portion 29c which runs from the end point 27 of the sloping path is substantially parallel to the plane P1.

The total length of each track of the first engagement elements 25 shown in FIGS. 1B and 2 is a relatively short compared to a circumference of the upper edge 22, in the present example less than one sixth of the circumference. The advantage of using relatively short tracks is that the required lifting and locking of the battery unit can be achieved without imparting a large angular momentum on the battery unit.

In the configuration of FIG. 2A the rollers 36 of the second engagement elements have moved from starting point 26, along portions 29a,29a of the sloping path, to beyond the end point 27 of the path, so that the battery unit will be in the mounted position. For keeping the battery unit substantially fixed in this mounted position, the ring 31 is provided with a notch 32, and a locking mechanism 33 which comprises a pin that is selectively moveable into and out of the notch 32, respectively for locking and allowing rotation of the ring. In order to lower the battery unit from the mounted position shown to the unmounted position, the locking mechanism can be operated to move the pin out of the notch, and subsequently rotating of the ring 31 is driving such that the rollers move relative to the track 29a, 29b, 29c towards the starting point 26 and subsequently off first engagement element 25

FIG. 3 schematically shows combination of the battery lifting system 30 of FIG. 1B, with the bearings 38 and with a pinion and rack drive 39, 39a. The pinion and rack drive comprises a toothed section on the ring 31, and a pinion gear 39a that connected to a motor 139, typically a stepping motor, for driving rotation of the pinion gear 39a, and thus rotation of the ring 31. The first and second engagements elements 25, 35 form pair of engagement elements that engage each other, as shown earlier in FIG. 2A. These multiple pairs of first and second engagement elements 25, 35 are evenly spaced with respect to the circumference of the battery unit 20, allowing for an even load distribution resulting from the weight of the battery over the engagement pairs 25, 35. Such an even load distribution enhances the self-aligning motion of the battery unit inside the battery receiving unit during lifting of the battery unit to the mounted position. Furthermore, by making use of multiple evenly spaced tracks, the chance of locating the battery unit below the battery receiving unit such that said the second engagement elements can engage the first engagement elements is increased, and thus the time required prior to starting the lifting motion to mount the battery unit is decreased. Finally, the use of an evenly spaced support system enhances the stability of the battery unit 20 inside the battery receiving unit during driving motions of the vehicle.

The pinion gear actuator 39a can be driven to drive rotation of the rotary ring 31 in a first direction, to allow the second engagement elements 35 to meet up with the first engagement elements 25 at their respective starting points 26, the first and second engagement elements in this manner forming pairs, each first and second engagement element of a pair moving with respect to each along a substantially helical path dictated by the shape of the track of the first engagement elements 25. As the first and second engagement elements 25, 35 follow this path with respect to each other in a first direction, the battery unit 20 is lifted from the unmounted position to the mounted position. The end points 27 of the tracks of the first engagement elements 25 coincide with the end point of the path and the mounted position of the battery unit 20 inside the battery receiving unit 10. When the pinion gear actuator 39a is driven to drive rotation of the rotary lock ring 31 in a second direction opposite from the first direction, the first and second engagement element pairs move in opposite direction with respect to each other, resulting in the path being followed in the opposite direction and the battery unit being lowered from the mounted position to the unmounted position.

Though not shown in the figures, the battery receiving unit may comprise sensors on one or more internal surfaces of the battery receiving unit facing the opening 11. These sensors can be set up to determine the location of a plane in which the engagement points, or starting points 26, of the first engagement elements 25 with respect to a plane in which the engagement points of the second engagement elements 35 are located, such that the actuators are only activated if these planes are aligned. The sensors could be powered independent from the battery unit 20 by making use of a small internal back-up battery in the electric vehicle, which recharges itself upon installation of the battery unit, making use of the energy stored therein. This same back-up battery may be used to power the one or more actuators of battery lifting system 30.

Though in the embodiments illustrated in the preceding figures the first and second engagement elements are shaped and arranged to move along substantially helical paths relative to each other when lifting the battery unit from the unmounted position to the mounted position or lowering the battery unit from the mounted position to the unmounted position, and both the opening and the battery unit have a substantially circle-shaped contour, it is noted that neither is required for the invention to work.

Figure 4A:
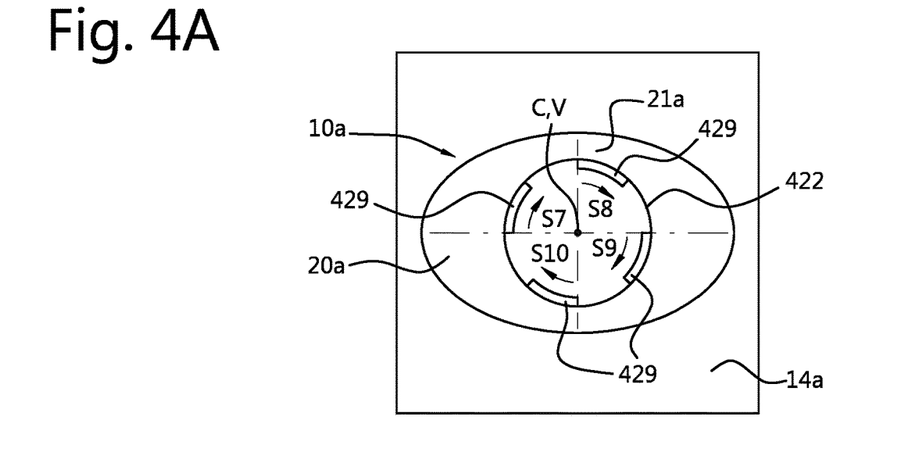
Figure 4B:
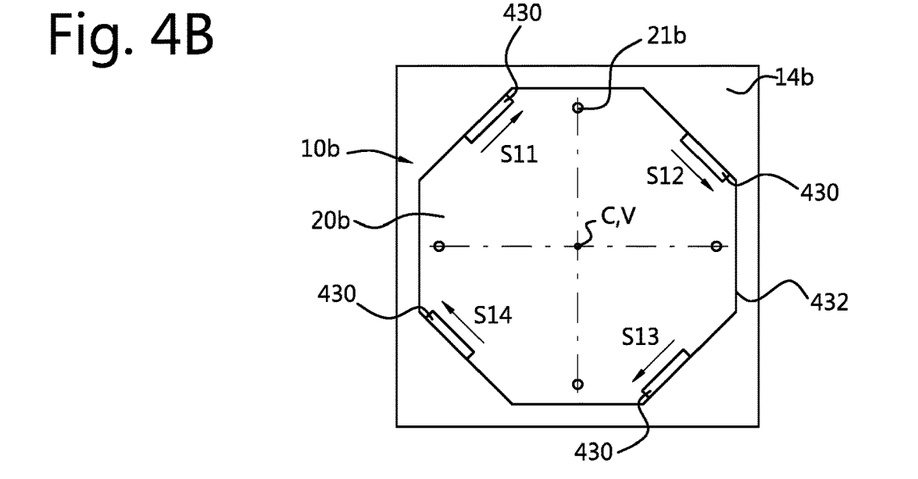
Figure 4C:
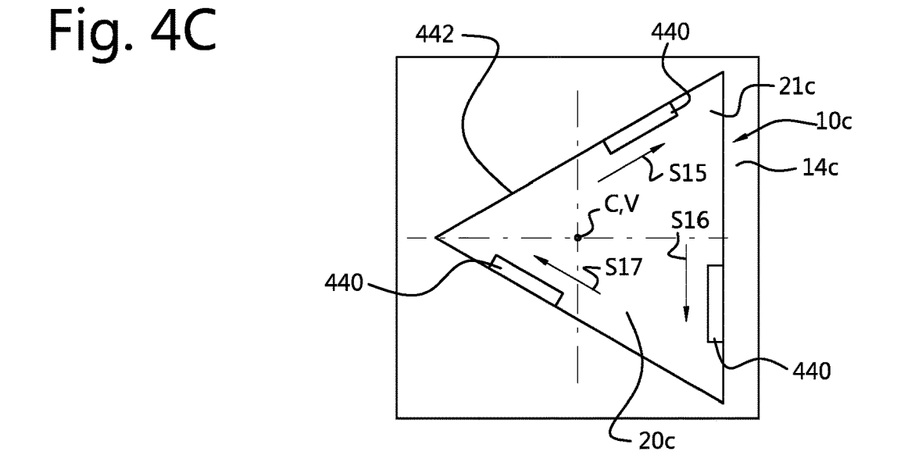

FIGS. 4A-4C schematically show bottom views of battery units and battery receiving units with corresponding openings having non-circular contours. For reasons of clarity the bottom plates of the battery units are shown as being transparent, so that the first engagement elements and structures supporting these are visible.

FIG. 4A shows a battery unit 20a with a bottom plate 21a that has a non-circular ellipse-shaped contour, and a battery receiving unit 10a with a housing 14a in which an opening with a similar ellipse shaped contour is formed. A cylindrical bush 422 has been welded onto the bottom plate, wherein on an inner surface of bush 422 the first engagement elements in the form of ramped tracks 429 are provided, first engagement element each defining a path along a substantially helical segment. In the bottom view shown, the paths are indicated by arrows S7-S10. Lifting and lowering of the battery unit is carried out in substantially the same manner as in the embodiment shown in FIGS. 1-3, i.e. the same support ring, second engagement elements and actuators can be used, though rotation of the battery unit relative to the housing 14a during such lifting or lowering is substantially blocked due to the substantially form-fitting manner in which the battery unit fits in the opening.

In FIG. 4A the paths along which first engagement elements move relative to the second engagement elements comprise are segments of helical paths. In contrast, in the embodiment shown in FIGS. 4B and 4C the paths, along which first engagement elements are moveable relative to the second engagement elements for lifting or lowering the battery unit between the mounted and the unmounted position, extend in planes parallel to the central axis C.

FIG. 4B shows a battery unit 20b having a bottom plate 21b with an octagonal contour, and a battery receiving unit 10b with a housing 14b with an opening with a similar octagonal shaped contour is formed. The first engagement elements of the battery unit 20b are formed by ramped tracks 430 that are fixed to the inner surface of the sidewall 432 of the battery unit. The battery receiving unit 10b is provided with second engagement elements, each of which is connected to a linear actuator for driving movement of each second engagement element, e.g. rollers as shown in FIG. 2A, relative to the housing 14b in a common plane. When the second engagement elements are driven in this manner, they can engage the tracks, and further movement of the first engagement element relative to and second engagement elements will cause these to move relative to each other along respective sloping paths, which are indicated in the bottom view of FIG. 4B by arrows S11-S13, thus lifting or lowering the battery unit.

FIG. 4C shows a battery unit 20c with a bottom plate 21c having a triangular contour, and a battery receiving unit 10c with a housing 14 in which an opening with a similar triangular contour is formed. The first engagement elements are formed by ramped tracks 440 that are fixed to the inner surface of the sidewalls of the battery unit and define sloping paths indicated by arrows S15-S17 The battery receiving unit is provided with linearly moveable second engagement elements, e.g. comprising rollers, which second engagement elements are moveable relative to the housing in a common plane that extends normal to the central axis. When the second engagement elements are driven to move within this plane while engaging the sloping portions of the tracks, further linear movement of each of the second engagement elements within the plane will causes the first and second engagement elements to move relative to each other along the corresponding sloping paths for lifting or lowering the battery unit.

Figure 4D:
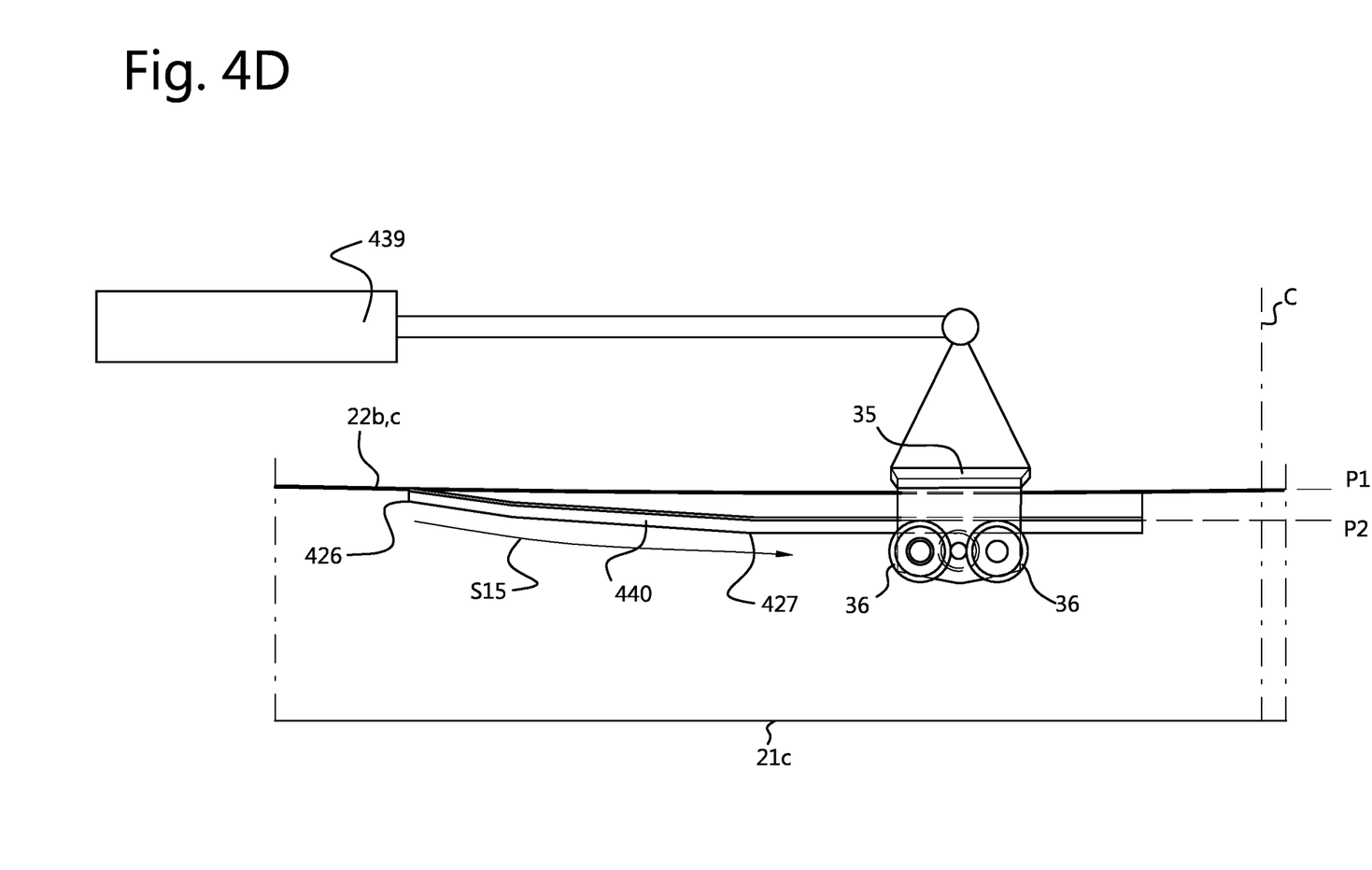
FIG. 4D shows a partial side view of a portion of a battery unit and a linear actuator arranged for driving linear movement of second engagement element relative to first engagement element along a path, and FIGS. 5A-5C schematically illustrate how a battery unit is mounted in a battery exchange system according to the invention.

FIG. 4D shows a partial side view of a portion of the battery unit 20c, further showing a linear actuator 439 in the form of a pneumatic cylinder 439 arranged for driving linear movement of second engagement element 35 relative to first engagement element 440 along the path indicated by arrow S15.

Figure 5A:
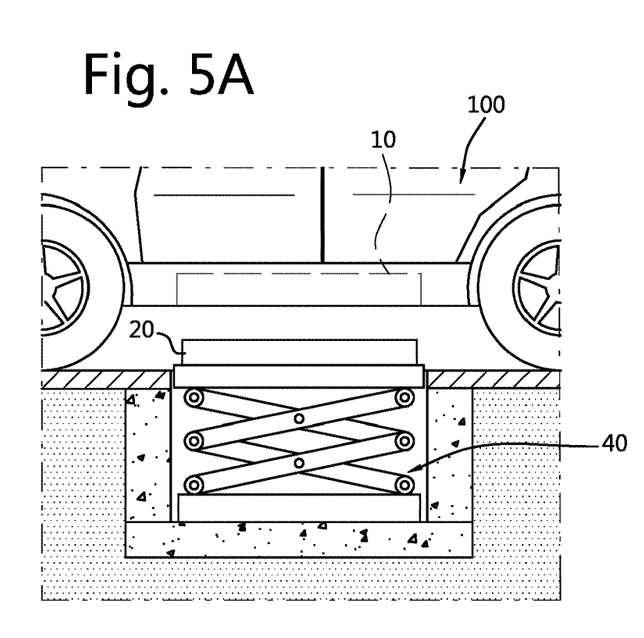
Figure 5B:
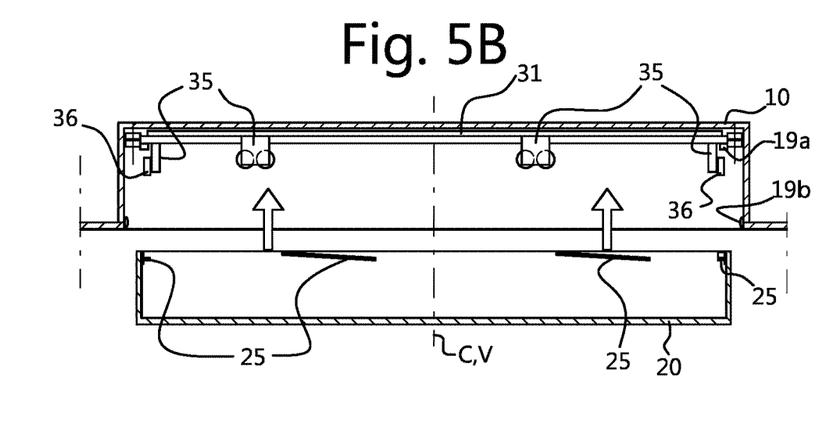
Figure 5C:
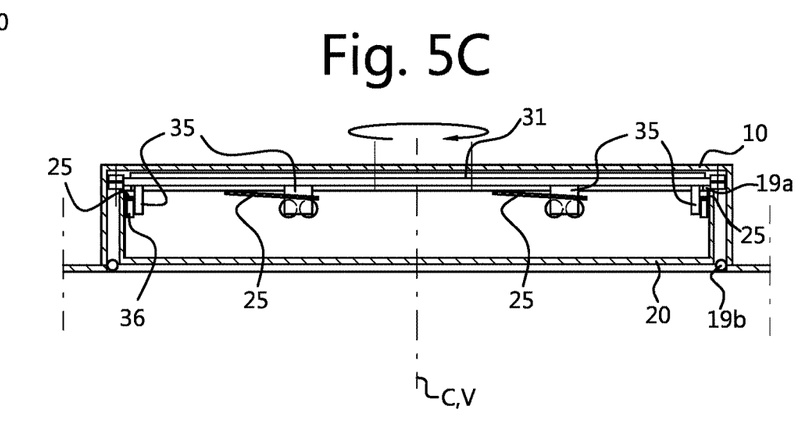

FIGS. 5A-5C schematically steps for mounting a battery unit 20 in a battery receiving unit 10 mounted to an electric vehicle 100, using the battery exchange system of the invention.

In FIGS. 5A and 5B the battery unit 20 is arranged substantially below the battery receiving unit 10 and in a position to be lifted upwards to the battery receiving unit 10 using an external lifting system 40 that is external to the vehicle 100. A detailed view of the battery unit 20 as it is lifted towards the battery receiving unit 10 by the external lifting system motion is provided in FIG. 5B, in which first engagement elements 25 of the battery unit 20 and second engagement elements 35 of the battery receiving unit 10 can also be seen. The external lifting system 40 lifts the battery unit up towards the battery receiving unit, until a plane through the engagement surfaces of the first engagement elements 25 aligns with a plane through an upper portion of the rollers 36 of the second engagement elements 35. The location of the battery unit 20 with respect to the battery receiving unit may be detected by sensors (not shown), located on an internal surface of the battery receiving unit 10 and which face the battery receiving opening and are in communication with said external lifting system 40 and/or the actuators of the battery receiving unit for moving the second engagement elements 35 with respect to the first engagement elements 25.

Once the engagement surfaces of the first and second engagement elements 25, 35 are substantially located in a single plane, a rotating motion around the central axis C of ring 31 causes said first and second engagement elements to move with respect to each other along associated helical paths, thus lifts the battery unit 20 into the mounted, final position inside the battery receiving unit 10. In the mounted position shown in FIG. 5C, the top edge of the battery unit's circumferential side plate abuts a seal 19a which is attached to the top section bottom plate 16b, ensuring no moisture or debris can enter into the battery unit. As an additional protection a secondary seal, here shown as an inflatable seal 19b though a lip seal may be used instead, is provided at the lower side of the bottom section of battery receiving unit, to prevents ingress of mud, gravel and other foreign materials to enter and block the gap between the battery unit 20 and the battery receiving unit bottom section 18.

When a simple battery lifting system is implemented, wherein the first engagement elements 25 are fixedly and stationary mounted onto the battery unit 20 and the second engagement elements 35 are fixedly and stationary mounted onto the battery receiving unit 10, the external lifting system 40 may be used to drive rotation around the central axis C between the first and second engagement elements. It is however preferred that the battery receiving unit comprises a battery unit lifting system as described for FIGS. 1-4, and that the external lifting system 40 is adapted for supplying the battery unit with an axial lifting motion along the vertical axis V only, after which the battery unit lifting system drives rotation of the first and second engagement elements relative to each other until to lift the battery unit off the external lifting system and to the mounted position.

In order to move the battery unit from the mounted position to the unmounted position, the motions shown in FIGS. 5A-5C can be performed in reverse direction and order.

The present invention has been described above with reference to a number of exemplary embodiments as shown in the drawings. Modifications and alternative implementations of some parts or elements are possible, and are included in the scope of protection as defined in the appended claims.

The invention claimed is:

1. A battery exchange system for an electric vehicle, comprising:
a battery unit comprising a bottom surface, a top surface and a circumferential side surface extending therebetween;
a battery receiving unit adapted for being fixed at or near an underside of the electric vehicle and comprising a housing with an opening at a bottom side of the housing for at least partially receiving the battery unit in the housing through the opening, wherein the battery receiving unit has a central axis which extends through the opening;
wherein the battery receiving unit is adapted for allowing movement of the battery unit along the central axis between an unmounted position below the battery receiving unit and a mounted position at least partially within the battery receiving unit,
wherein the battery unit comprises first engagement elements and the battery receiving unit comprises second engagement elements, each of the first and second engagement elements being adapted for engaging each other while moving relative to each other along an associated sloping path in order to lift the battery unit from the unmounted position to the mounted position or lower the battery unit from the mounted position to the unmounted position, wherein said associated sloping path slopes with respect to a plane normal to the central axis, wherein the second engagement elements are adapted for moving relative to the housing in a common plane that is substantially normal to the central axis.

2. The system according to claim 1, wherein each of said sloping paths associated with one of said first engagement elements and one of said second engagement elements is spaced apart from the other sloping paths which are associated with another of the first engagement elements and another of the second engagement elements, each of said sloping paths comprising a starting point and an end point, wherein the starting points of the sloping paths lie in a first common plane, and the end points of the sloping paths lie in a second common plane.

3. The system according to claim 2, wherein the slope of each path extending between the first common plane and the second common plane has a positive gradient of less than 25 degrees from the first plane along the entire length of the path between the first plane and the second plane.

4. The system according to claim 2, wherein the first and second engagement elements form pairs of first and second engagement elements for engaging each other, wherein in each pair one of the first and second engagement elements comprises a portion adapted for engaging the other element of said pair during movement of the battery unit between the mounted and unmounted position, wherein said portion is ramped with respect to said first and second planes.

5. The system according to claim 1, wherein each of said sloping paths is formed as a segment of a substantially helical path.

6. The system according to claim 1, wherein the gradient of each of said sloping paths varies and decreases monotonically along the path from the starting point towards the end point.

7. The system according to claim 1, wherein the first and second engagement elements are adapted for engaging each other while moving relative to each other along said sloping path to lift or lower the battery unit between the unmounted and mounted position such that the battery unit is lifted or lowered along the central axis in a substantially translational motion during which the battery unit rotates, in a plane normal to the central axis, no more than 10 degrees around the central axis.

8. The system according to claim 1, wherein the battery receiving unit comprises at least three second engagement elements, wherein the second engagement elements are circumferentially spaced apart from each other when viewed in projection onto the plane normal to the central axis.

9. The system according to claim 1, wherein the battery receiving unit further comprises one or more actuators for moving the first and second engaging elements relative to each other along their associated paths in order to lift the battery unit from the unmounted position to the mounted position or lower the battery unit from the mounted position to the unmounted position, while driving movement of the second engagement elements relative to the housing in a common plane that is substantially normal to the central axis.

10. The system according to claim 1, wherein when viewed in projection onto said plane normal to the central axis, each of said paths has a length of less than one sixth of the circumferential length of the circumferential side surface.

11. The system according to claim 1, wherein the opening has a non-circular shape which substantially matches the shape of the circumferential side surface of the battery unit.

12. The system according to claim 1, wherein the first and second engagement elements form pairs of first and second engagement elements for engaging each other, wherein in each pair one of the first and second engagement elements comprises one or more rollers for rolling engagement with the other element of said pair during movement of the battery unit between the mounted and unmounted position.

13. The system according to claim 1, wherein the battery receiving unit comprises a support ring that is rotatable relative to the housing around the central axis of the battery receiving unit, wherein the second engagement elements are mounted on the support ring.

14. The system according to claim 13, wherein the battery receiving unit further comprises a mechanical locking mechanism for locking the battery unit in position when the battery unit is in the mounted position.

15. The system according to claim 1, wherein the circumferential side surface of the battery unit, when viewed in projection onto a plane normal to a central axis of the battery unit which extends through the top and bottom surface, has a non-circular outer contour.

16. The system according to claim 1, wherein the circumferential side surface of the battery unit, when viewed in projection onto a plane normal to a central axis of the battery unit which extends through the top and bottom surface, has a polygonal or ellipse-shaped contour.

17. A battery exchange method for an electric vehicle comprising a battery receiving unit fixed at a bottom side of the vehicle and comprising a housing with an opening at a bottom side of the housing for at least partially receiving the battery unit in the housing through the opening, wherein the battery receiving unit has a central axis which extends through the opening and is further provided with second engagement elements arranged within the housing, wherein the second engagement elements are adapted for moving relative to the housing in a common plane that is substantially normal to the central axis, the method comprising:

i) placing a battery unit below the opening of the housing, such that, wherein viewed in projection onto a plane normal to the central axis, the battery unit is completely overlapped by the opening, the battery unit comprising first engaging elements for engagement with said second engagement elements, ii) using a lifting device external to the electric vehicle, lifting the battery unit towards the opening to an unmounted position; and iii) moving each of the second engagement elements into engagement with a corresponding one of said first engagement elements, and subsequently driving further movement the each of the first and second engagement elements relative to each other along an associated sloping path in order to lift the battery unit from the unmounted position to the mounted position, wherein each of said associated sloping paths slopes with respect to a plane normal to the central axis.

18. The method according to claim 17, wherein the battery receiving unit comprises a support ring that is rotatable relative to the housing around the central axis of the battery receiving unit, wherein the second engagement elements are mounted on the support ring, and step iii) comprises driving rotation of support around the central axis for bringing the first and second engagement elements into engagement with each other and driving said further movement of the first and second engagement elements along the associated sloping paths.

* * * * *